United States Patent [19]
Langer

[11] 3,743,121
[45] July 3, 1973

[54] UNLOADING CHUTE ASSEMBLY AND MEANS DETACHABLY CARRYING SAME ON A VEHICLE

[76] Inventor: John F. Langer, 908 1st Avenue, Northwest, Faribault, Minn.

[22] Filed: Apr. 14, 1971

[21] Appl. No.: 133,963

[52] U.S. Cl............ 214/44 R, 193/4, 214/83.26, 280/43.13, 280/150.5
[51] Int. Cl............................................ B65g 67/24
[58] Field of Search................ 214/44 R, 83.26, 214/85; 193/4-6; 280/150.5, 43.13

[56] References Cited
UNITED STATES PATENTS

| 1,028,831 | 6/1912 | Stagg | 193/4 |
| 1,259,227 | 3/1918 | Gross | 214/44 R |
| 2,169,453 | 8/1939 | Schenbeck | 214/83.26 X |
| 3,372,769 | 3/1968 | Jung et al. | 280/43.13 X |

*Primary Examiner*—Robert G. Sheridan

[57] ABSTRACT

An adjustable and portable hydraulic chute. This device is carried by a trailer being towed by a tractor.

The device includes fold-down wheels with hydraulic cylinders for operating the wheels and adjusting the angle of the chute portion of the device.

1 Claim, 6 Drawing Figures

PATENTED JUL 3 1973 3,743,121

INVENTOR.
John F. Langer

INVENTOR.
John F. Langer

UNLOADING CHUTE ASSEMBLY AND MEANS DETACHABLY CARRYING SAME ON A VEHICLE

This invention relates to chutes for unloading trucks and the like.

It is therefore the primary purpose of this invention to provide a hydraulic loading chute transport which will be carried by the trailer so that it will be readily available for unloading the trailer at its destination.

Another object of this invention is to provide a chute apparatus which will be operated by hydraulic means to affect the proper positioning of the chute member and raising and lowering the legs of the device.

Another object of this invention is to provide a chute apparatus which will have a main frame portion in which will be mounted the motor and pump means for operating the hydraulic cylinders to lower or raise the wheel portions and also to lift the chute portion to any desired angle.

A further object of this invention is to provide a chute apparatus of the type described which will have locking means for rendering the wheel portions stationary in the upward and downward position.

Other objects of the present invention are to provide a hydraulic loading chute transport which is simple in design, inexpensive to manufacture, rugged in construction, easy to use and efficient in operation.

These and other objects will be readily evident upon a study of the following specifications and accompanying drawing wherein.

Figure 1:
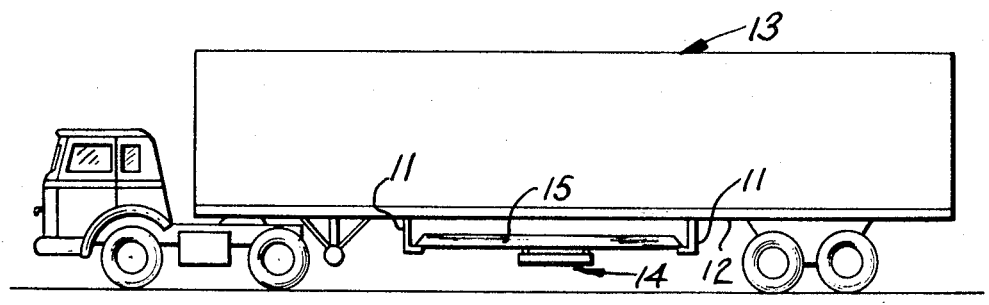
FIG. 1 is a side view of a tractor trailer combination showing the invention in its carried position while in transport.
Figure 2:
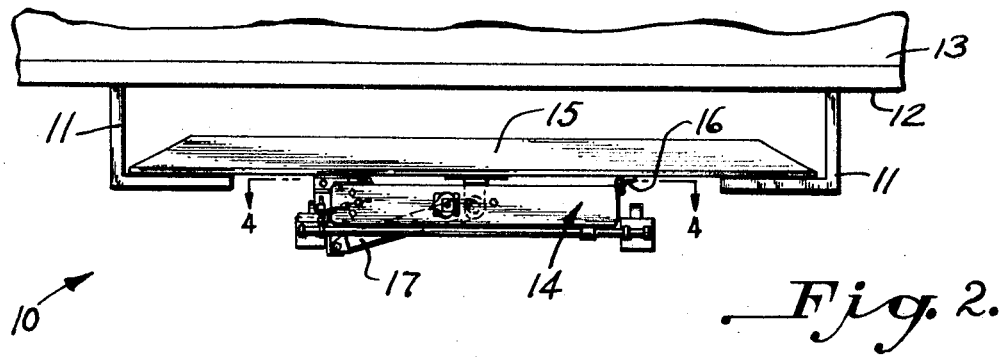
FIG. 2 is an enlarged side view of the invention shown in elevation.
Figure 3:
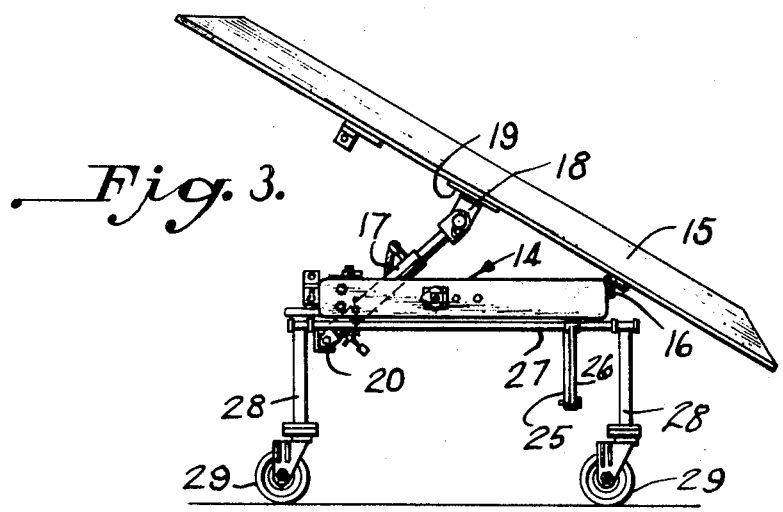
FIG. 3 is a side view of the invention showing it removed from the trailer with the leg portions shown in their lowered position and also shows a chute member lifted.
Figure 4:
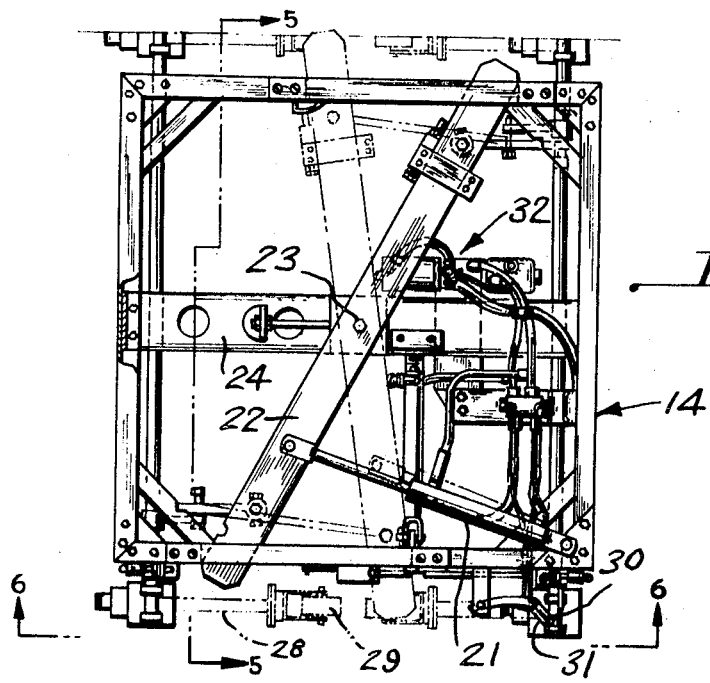
FIG. 4 is a view taken along the lines 4—4 of FIG. 2.
Figure 5:
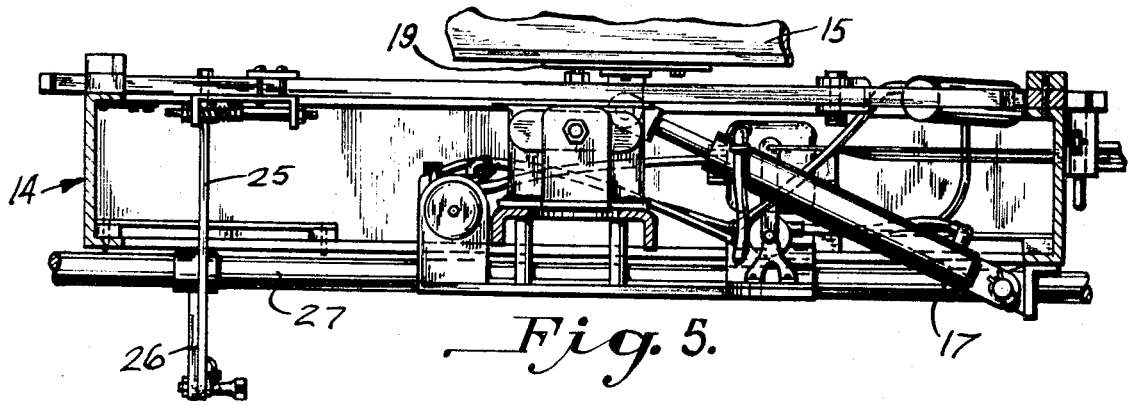
FIG. 5 is a cross-sectional view taken along the lines 5—5 of FIG. 4.
Figure 6:
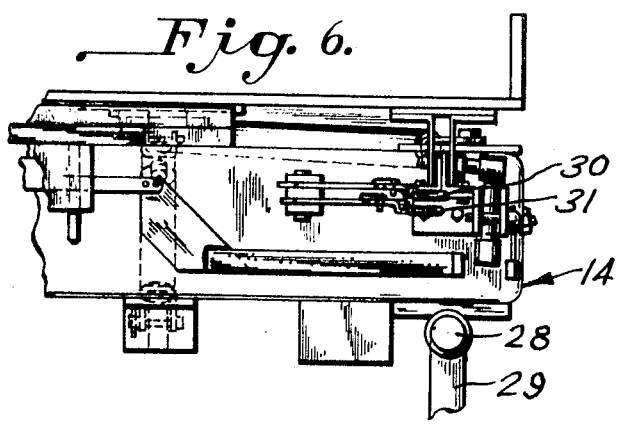
FIG. 6 is a fragmentary and enlarged view taken along the lines 6—6 of FIG. 4.

According to this invention, a hydraulic loading chute transport 10 is shown to include brackets 11 of L-shaped configuration which are fixedly secured to the underside 12 of trailer 13.

Brackets 11 serve to support hydraulic loading chute transport 10 while the trailer 13 is in transport.

Hydraulic loading chute apparatus 10 is shown to include also, a hollow rectangular frame 14 which carries an enlongated chute member 15 which is hingeably secured by end 16 to frame 14.

A hydraulic cylinder 17 is secured to a bracket 18 pivotably and bracket 18 is fixedly secured to a crossbar member 19 of chute 15. The opposite end of hydraulic cylinder 17 is pivotably secured to a bracket 20 on the underside of frame 14.

Hydraulic cylinder 17 serves to raise and lower chute member 15 to any desired angle for unloading the trailer 13.

A second hydraulic cylinder 21 is pivotably secured to frame 14 at one end and is pivotably secured to a bar 22 which is pivotable at pin 23 of a central cross bar 24 of frame 14.

Arms 25 secured to bar 22 are pivotly secured to arms 26 extending off of shafts 27. The arms 26 are fixedly secured to shafts 27 and when the hydraulic cylinder 21 is actuated, will pivot the plurality of legs 28 upward or downward depending upon the desire of the operator.

Pivotably attached to legs 28 are caster wheels 29 which enable apparatus 10 to be placed in any desired position.

A pair of levers 30 and 31 provide control means for apparatus 10 through the motor and hydraulic pump arrangement 32 carried within frame 14.

In use, the legs 28 and their attached wheels 29 are lowered by means of hydraulic cylinder 21, and when they are fully lowered and locked, apparatus 10 will clear the support brackets 11 of trailer 13 and thus allow the operator to roll the apparatus 10 to the loading site.

The chute member 15 is then raises to any desired position by means of the hydraulic cylinder 17.

What I claim is:

1. An unloading apparatus for use with a vehicle having bracket means on the underside thereof for carrying and transporting such apparatus, said apparatus comprising a frame, parallel shafts journalled on opposite sides of said frame and having supporting legs extending radically therefrom, a bar pivotally attached at its center to the center of said frame and extending generally parallel to said bar, link means connected respectively to opposite ends of said bar and said shafts such that pivoting of said bar will rotate said shafts and extend or retract said supporting legs, caster means carried by said legs, actuator means for pivoting said bar, a chute pivotally connected at one end thereof to said frame, whereby upon extension of said legs the apparatus may be rolled free of said brackets to a suitable position relative to the vehicle and the chute may be pivoted to an inclined position to receive goods from said vehicle.

* * * * *